US007657495B2

(12) United States Patent
Hunter et al.

(10) Patent No.: US 7,657,495 B2
(45) Date of Patent: Feb. 2, 2010

(54) METHOD AND SYSTEM FOR CREATING HIERARCHICAL CLASSIFIERS OF SOFTWARE COMPONENTS TO IDENTIFY MEANING FOR WORDS WITH MULTIPLE MEANINGS

(75) Inventors: Robert James Hunter, Fleet (GB); James Steven Luke, Cowes (GB)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 11/253,103

(22) Filed: Oct. 18, 2005

(65) Prior Publication Data

US 2006/0085366 A1  Apr. 20, 2006

(30) Foreign Application Priority Data

Oct. 20, 2004   (GB)   ................................. 0423221.1

(51) Int. Cl.
  *G06E 3/00*   (2006.01)
  *G06E 1/00*   (2006.01)
  *G06G 7/00*   (2006.01)
(52) U.S. Cl. ......................................................... 706/20
(58) Field of Classification Search .................... 706/20
  See application file for complete search history.

(56) References Cited

U.S. PATENT DOCUMENTS

| | | | | |
|---|---|---|---|---|
| 3,932,859 | A | * | 1/1976 | Kyriakides et al. ........... 345/171 |
| 4,989,258 | A | * | 1/1991 | Takahashi et al. ............ 382/226 |
| 5,388,196 | A | * | 2/1995 | Pajak et al. .................. 715/751 |
| 5,559,693 | A | | 9/1996 | Anick et al. |
| 5,615,378 | A | * | 3/1997 | Nishino et al. ................. 704/4 |
| 5,765,180 | A | * | 6/1998 | Travis ......................... 715/257 |
| 2001/0037346 | A1 | | 11/2001 | Johnson ....................... 707/513 |
| 2003/0018598 | A1 | | 1/2003 | Cawse et al. ................... 706/13 |
| 2004/0073874 | A1 | * | 4/2004 | Poibeau et al. ............... 715/531 |

FOREIGN PATENT DOCUMENTS

WO  WO 03/003241 A1  1/2003

OTHER PUBLICATIONS

"Introduction to XML" "How can XML be used", "XML Syntax" and "XML elements"). Refsnes data inc 2003 (verified by Wayback Machine).*
Mitchell et al, "Modeling the Search Landscape of Metaheuristic Software Clustering Algorithms", 2003.
Winter et al, "An Overview of the GXL Graph Exchange Language", 2002.
Choudhury et al, "Optical Music Recognition System within a Large-Scale Digitization Project", 2000.
Mierswa et al, "A Flexible Platform for Knowledge Discovery Experiments: YALE—Yet Another Learning Environment", 2003.

* cited by examiner

*Primary Examiner*—David R Vincent
*Assistant Examiner*—Ben M Rifkin
(74) *Attorney, Agent, or Firm*—Schmeiser, Olsen & Watts; Willam H. Steinberg (57) ABSTRACT

A method for creating hierarchical classifiers of software components in a learning system, each software component comprising an identifier and a rule for processing an input message, the method comprising the steps of: receiving an input message by a first software component; parsing the input message to identify an input value; seeking a second software component having an identifier matching the identified input value; in the event that the seeking step fails to locate a match, creating a second software component and assigning an identifier to the created second software component, the identifier matching the identified input value.

14 Claims, 11 Drawing Sheets

METHOD AND SYSTEM FOR CREATING HIERARCHICAL CLASSIFIERS OF SOFTWARE COMPONENTS TO IDENTIFY MEANING FOR WORDS WITH MULTIPLE MEANINGS

FIELD OF THE INVENTION

The invention relates to the field of artificial intelligence and in particular to a method and system for creating hierarchical classifiers of software components.

BACKGROUND OF THE INVENTION

The functionality of any information system may be described as a series of information transformations. A simple database query can transform the contents of the database and the query information into a specific result set. Financial applications can transform the contents of a database into meaningful financial metrics or a number of graphical illustrations. The ability of being able to perform the information transformation is often carried out by artificial intelligence systems, which include, expert systems, neural networks and case based reasoning applications.

Another type of artificial intelligence system which is gaining in popularity is natural language processing. Natural language processing is concerned with designing and building software that will analyse, understand and generate languages that humans naturally use. This concept is by no means easy, as understanding what a language means, for example, what concepts a word or phrase stands for and knowing how to link those concepts together in a meaningful way is an incredibly difficult task.

A major challenge in any natural language application is to understand and appreciate the context of a word, sentence or phrase. This involves analyzing the sentence to try and determine the context of the sentence; particularly, as the context of a sentence is influenced by many factors including, preceding content of a sentence, the location of the speaker of the sentence, and the particular environment of interest. In order to understand the context of the two sentences below, the natural language application would have to analyse both sentences and determine the context of each sentence. For example looking at the two sentences below:

James, the door is open

James, is the door open?

Both sentences are almost identical but the first sentence 'James, the door is open', is an action and the sentence 'James, is the door open?' is a request. Therefore the context of the sentence must be understood.

Therefore, when using natural language applications in a particular environment, for example, in a legal environment, to enable the natural language application to work successfully i.e. to produce better results, the natural language application needs to be customized to the environment that the application is working in. For example in a legal environment the difference between the use of the word 'shall' and 'will' is of great significance.

Another example of this is when, using a natural language application in a banking environment and the employees of the bank use particular terminology to describe various processes used throughout their day to day activities. The natural language application would need to be customized to comprise an understanding of the banking terminology, for example, the definition, and contextual meaning of terms, such as, debit, credit and overdraft etc.

In a business environment as more and more processes change or more and more different scenarios develop for a given situation; there is a need to customise the natural language application by adding new rules or modifying an existing training set. This becomes incredibly time consuming and can take days to write just one rule. Using conventional technologies, this creates a burden on the organizations that are using these types of applications and has hindered the development and adoption of natural language applications into common day practice.

Existing techniques for customizing natural language applications include the task of editing domain specific dictionaries and taxonomies to include the terminology expected in the final application. More advanced techniques include the development and implementation of specific language processing rules using systems, such as, VISUALTEXT®, from Text Analysis International, Inc,. VISUALTEXT provides the functionality for information extraction, natural language processing and text analysis for a variety of applications. For example, business events may be extracted from web sites and a searchable database can be built for searching for the latest business information.

Even with tools, such as, VISUALTEXT, the development of new language processing rules requires an in-depth expertise in the field of natural language.

Most types of artificial intelligence systems use a variety of mathematical techniques to automatically or semi-automatically discover patterns and develop rules. Whilst the specific form of these rules differs depending on the techniques used, the general principle of mapping some form of input pattern to some form of output pattern, is common across most techniques. For example, rule induction systems employ rule induction algorithms i.e. statistical modelling techniques, to perform recursive functions through a tree structure and construct sub structures and rules as a result. Rule induction system work better when the feature space that it is operating in is fixed and pre-defined. For example, when using a technique called N-Grams. N-grams are a separate technique from rule induction systems; however they both have the same limitation of working best with well defined and constrained feature spaces. Such techniques are described in the book: *Programs for Machine Learning*, by John Ross Quinlan, Morgan Kauffman, 1993.

Neural networks are modeled on a cellular structure; however the methods of specifying the cell structure are limited. For example, in some types of neuro-fuzzy systems it is possible to define a structure based on knowledge of the order of the underlying functions. Similarly, with lattice based neurons (e.g. CMAC) there are formal strategies or algorithms for knot placement. However, in many areas further work is still needed in understanding how to structure large systems with many thousands of cells. Many researchers have focused on the scale of large systems in the belief that self organizing rules will enable the emergence of structures. This has not proved to be the case. Garis's work on the emulation of billions of neurons focuses almost entirely on the processing load issues and not on the definition of the cell structure. This is still a problem that needs to be solved.

Finally, most artificial intelligence technologies are most successfully applied in constrained applications where a static feature space is formally defined and sufficient training data exists to fully populate that static feature space. Artificial intelligence technologies are less successful in areas where the feature space is dynamic and unconstrained; for example when new features are frequently introduced into the natural language system, or where a sub structure of a feature changes.

Therefore there is a need within the art for the above mentioned problems to be alleviated.

SUMMARY OF THE INVENTION

Viewed from a first aspect, the present invention provides a method for creating hierarchical classifiers of software components in a learning system, a software component comprising an identifier and a rule for processing an input message, the method comprising the steps of: receiving an input message by a first software component; parsing the input message to identify an input value; seeking a second software component whose identifier matches the identified input value; in the event that the seeking step fails, creating a second software component and assigning an identifier to the created second software component, the identifier matching the identified input value.

In an embodiment of the method for analyzing and processing unstructured text. The software components are capable of operating on an unconstrained feature space. For example, in a financial application a series of messages may be generated that describe "company profitability". These messages could have different sub structures and do not need to be normalized onto a structured feature space (as is the case with neural and rule induction systems). Furthermore once an initial model has been constructed, new definitions of "company profitability" could be generated without the need to re-visit and amend the previous definitions. The cellular decision engines will also manage cases where counter examples are presented and adjust the model accordingly. The system used in the text analysis application operates entirely on a symbolic as opposed to a statistical basis. As generalization is not based on statistical normalization, the system is capable of taking into account very small, changes in a message that influence the overall meaning of the text (e.g. the existence of an apostrophe, the different spelling of a name, etc). Therefore the system is able to automatically evolve cell structures according to a set of symbolic processing rules as claimed above.

Preferably, the present invention provides a method wherein the created second software component comprises a rule for matching the identified input value of a subsequent received input message and determining whether an identifier of a third software component matches the identified input value.

Preferably, the present invention provides a method wherein the second software component further comprises a rule for matching the identified input value of a subsequent received input message, determining whether an identifier of a third software component matches the identified input value and placing an inhibit value of the identified input value.

Preferably, the present invention provides a method wherein the inhibit value stops a rule for triggering an action.

Preferably, the present invention provides a method wherein the input message is an XML message.

Preferably, the present invention provides a method wherein the received message comprises a plurality of input values forming a structure of a context.

Preferably, the present invention provides a method wherein the context is a sentence, a phrase, word or a numerical value.

Preferably, the present invention provides a method wherein the rule is a symbolic processing rule.

Viewed from a second aspect, the present invention provides a system for creating hierarchical classifiers of software components in a learning system, a software component comprising an identifier and a rule for processing an input message, the system comprising: a receiver for receiving an input message by a first software component; a parser for parsing the input message to identify an input value; a determination component for determining a second software component whose identifier matches the identified input value; a creator component for creating a second software component and assigning an identifier to the created second software component, the identifier matching the identified input value, in dependence of a negative determination by the determination component.

Preferably, the present invention provides a system wherein the created second software component comprises means for a rule for matching the identified input value of a subsequent received input message and means for determining whether an identifier of a third software component matches the identified input value.

Preferably, the present invention provides a system wherein the second software component comprises means for a rule for matching the identified input value of a subsequent received input message, means for determining whether an identifier of a third software component matches the identified input value and means for placing an inhibit value of the identified input value.

Preferably, the present invention provides a system wherein the inhibit value stops a rule from triggering an action.

Preferably, the present invention provides a system wherein the input message is an XML message.

Preferably, the present invention provides a system wherein the received message comprises a plurality of input values forming a structure of a context.

Preferably, the present invention provides a system wherein the context is a sentence, a phrase, word or a numerical value.

Preferably, the present invention provides a system wherein the rule is a symbolic processing rule.

Viewed from a third aspect, the present invention provides a computer program product loadable into the internal memory of a digital computer, comprising software code portions for performing, when said product is run on a computer, to carry out the invention as described.

BRIEF DESCRIPTION OF THE DRAWINGS

Embodiments of the invention are described below in detail, by way of example only, with reference to the accompanying drawings in which.

DETAILED DESCRIPTION OF THE INVENTION

Figure 1:
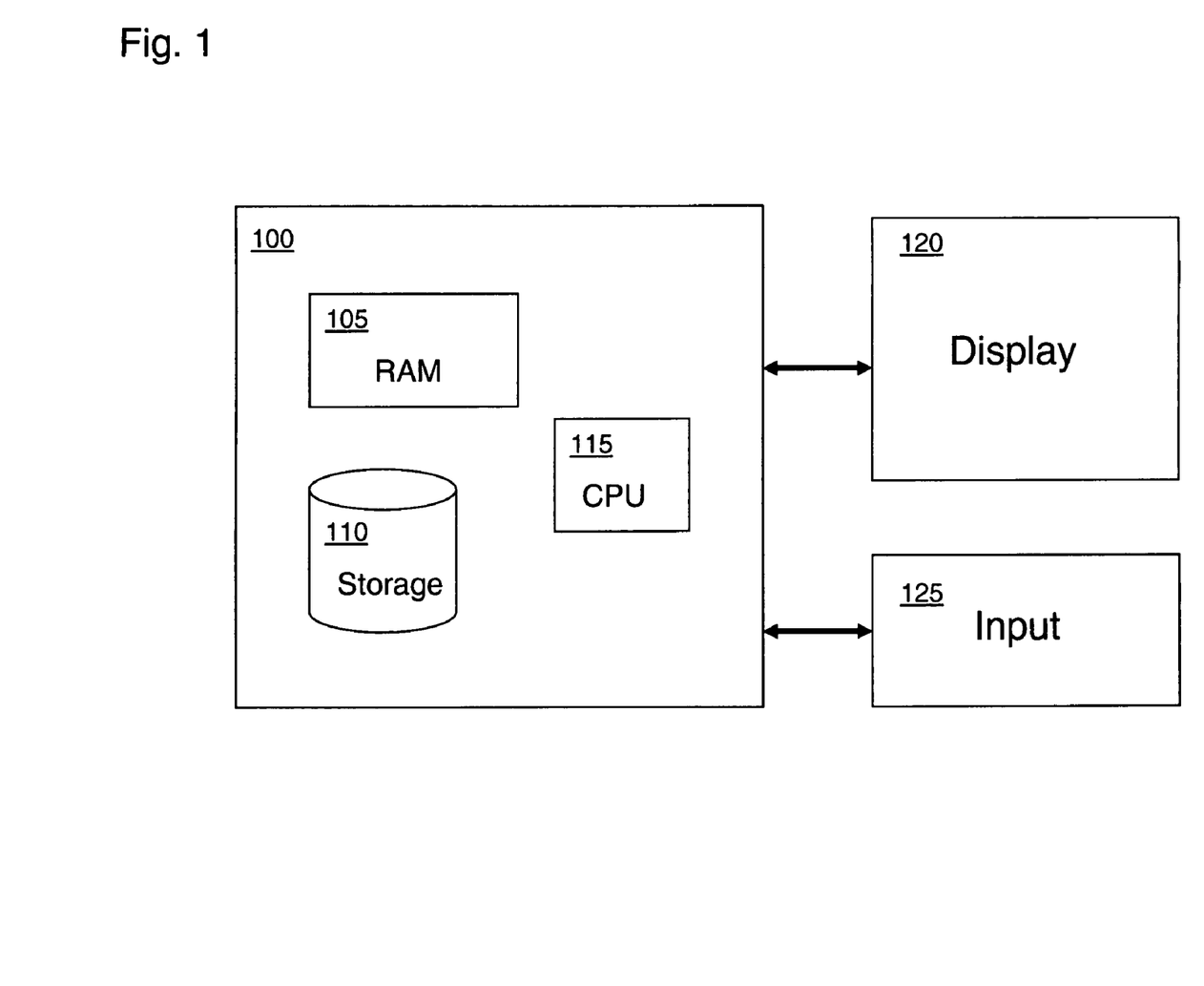
FIG. 1 shows a data processing system in which the present invention may be embodied.

FIG. 1 illustrates a data processing system 100 of which the present invention may be embodied. The data processing system 100 comprises a number of components including a data storage device 110, a central processing unit 115 and random access memory 105. The data processing system 100 further comprises a display device 120 for displaying textual and graphical information, and user interface devices 125 (keyboard and mouse) for receiving user input. The invention may operate on the data storage device of the data processing system 100 or other storage devices, for example a networked storage device.

Figure 2:
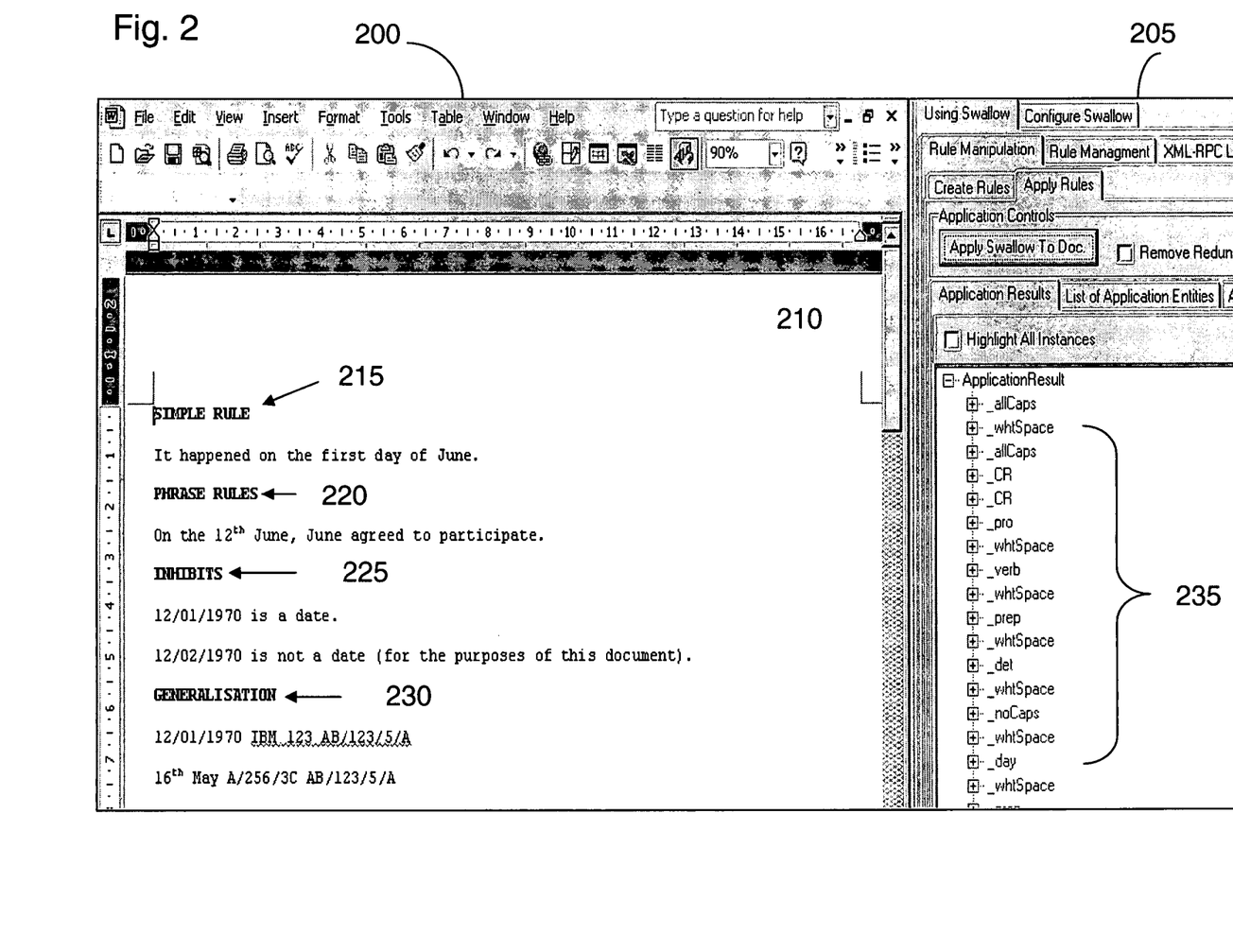
FIG. 2 illustrates a fact and extraction tool residing on the data processing system of FIG. 1, in which the present invention may be embodied.

FIG. 2 shows an example of a front of screen interface for a hierarchical fact extraction tool 200 (hereafter described as the 'tool') that may incorporate the present invention. The tool 200 may be developed in any programming language and can be developed as an 'add on' to an existing word processing application or as a standalone application with its own text editing functions. The tool 200 may be used in a standalone environment or as a multi user tool 200 in a distributed environment.

The tool 200 comprises a number of windows 210, 205, each window performing a specific function. In FIG. 2, two windows are displayed 210, 205. Window 210 comprises a word processing application for the creation or importation of documents comprising text and/or graphics for building into training messages. The tool 200 allows any text to be dragged and dropped into the window 210, for the selection of the text for the creation of a number of rules and for the transformation of those rules into an XML training message. Any text may be dragged and dropped, for example, text found in word-processing applications, emails, books, documents, web pages and text from modelling tools etc.

In window 210, an example is shown of a number of sentences under various headings. The headings of the text in this example are displayed for clarity and to help aid the readers understanding of the invention. The first heading 215, shows the text 'it happened on the first day of June'. A user of the tool 200 is able to select parts of the sentence and classify the words as a verb, noun, proposition, a name, or a date etc, such that the entire sentence is classified into a known structure.

In this example, the word June is of significance and thus, the word June is classified as a date. Such that, when using the sentence 'it happened on the first day of June', which had previously been classified by noun, verb etc, the tool may build a rule which states every time you identify a structure with a demonstrative (it), verb (happened), adjective (on), definite article (the), noun (first), noun preposition (day), followed by a word, the date, in this example June, is a date.

Other type of rules can be built, for example, phrase rules 220, inhibit rules 225 and generalisation rules 230. In particular inhibit rules are built in order to restrict rules triggering an action under certain conditions. For example, in the sentence 'it happened on the first day of June'. June has been classified as a date. But taking the sentence, on the 12$^{th}$ June, June agreed to participate', June in this sentence is a name of a person and not a month. In this example, when a rule is faced with this structure, an inhibit value is placed on the rule to say in this situation don't trigger an action.

Generalization rules allow a rule to state that every time it is presented with a sentence in a particular structure, the structure should be classed as a reference number or the like. 1

The selection of the text allows every word within a piece of text to be correctly classified and correctly tagged with XML. Thus, when using the tool 200 for free text analysis for a number of documents stored in a data store, the text within the document may be classified in a meaningful manner and thus, by using XML, a hierarchical representation is created.

Window 205 comprises the core management functions of the tool 200. A user is able to select a number of functions including, the creation of rules, the application of rules, rule manipulation, rule management and configuration of the tool 200 etc. Window 205 further comprises a display window 235 for viewing the types of rules that may be applied to the text and the results of the application of the rules onto the text.

Once the chosen text has been classified, the tool 200 constructs an XML training message. The user many amend the XML message to either correct any errors or to specify the conversion of factual information into a standard representation schema.

The output of the tool 200 is a training message as follows:

```
<root>
    <Scenario>
        <output>
            <traffic lights value = 'stop'>
        </output>
        <input>
            <red Value ='stop'/>
            <green value = 'go'/>
            <amber value = 'stop'/>
        <input>
    </scenario>
</root>
```

The training message comprises XML tags which define a scenario (in this example, the concept of traffic lights), output tags, which define an output message and input tags which define what inputs are required in order to get the required output. The training message is transmitted to a cellular decision engine for processing, which is explained below with reference to FIG. 3.

XML is preferably used for the definition of messages for building training message sets, i.e. training the system to learn. XML provides syntax for developing specialized mark-up languages, to add identifiers, or tags to certain characters, words or phrases in a document so as to enable recognition and action during processing. Marking up of a document or data results in the formation of a hierarchical container that is platform, language and vendor independent and separates the content from the environment. Unlike HTML which uses tags to define the presentation of data, XML allows the user to define the identify of the data. Defining a mark up language involves defining the data elements, attributes and rules for their use. In XML, this is currently stored in a Document Type Definition (DTD). A well-formed and valid XML document conforms to the referenced DTD. XML provides a simple means of representing tree-structured data, because the DTD is a hierarchical.

Although XML is the preferred mark-up language of the present invention, it will be appreciated by a person skilled in the art that other forms of hierarchical data definition languages can be used.

Once the XML message has been defined by the tool, the XML message is passed to a cellular decision engine to process an output message. The present invention uses a cellular decision engine technique which provides for the automatic evolution of cell structures according to a set of symbolic processing rules.

A cellular decision engines is a software object that receives an input message, processes the message according to a number of internally held rules and in response to the processing step generates an output message. Whilst processing an input message, a cellular decision engine may construct a sub network of cellular decision engines and cascade elements of the input message to the cellular decision engines within the sub networks. The cellular decision engines within the sub networks process the cascaded message in an identical manner to their parent cells (i.e. the cells at the level above the cells within the sub network); this many include the potential construction of another sub network and the generation of output messages. In this manner, a network of cellular decision engines process received messages in a highly recursive manner which may emerge into a complex cellular topology.

Figure 3:
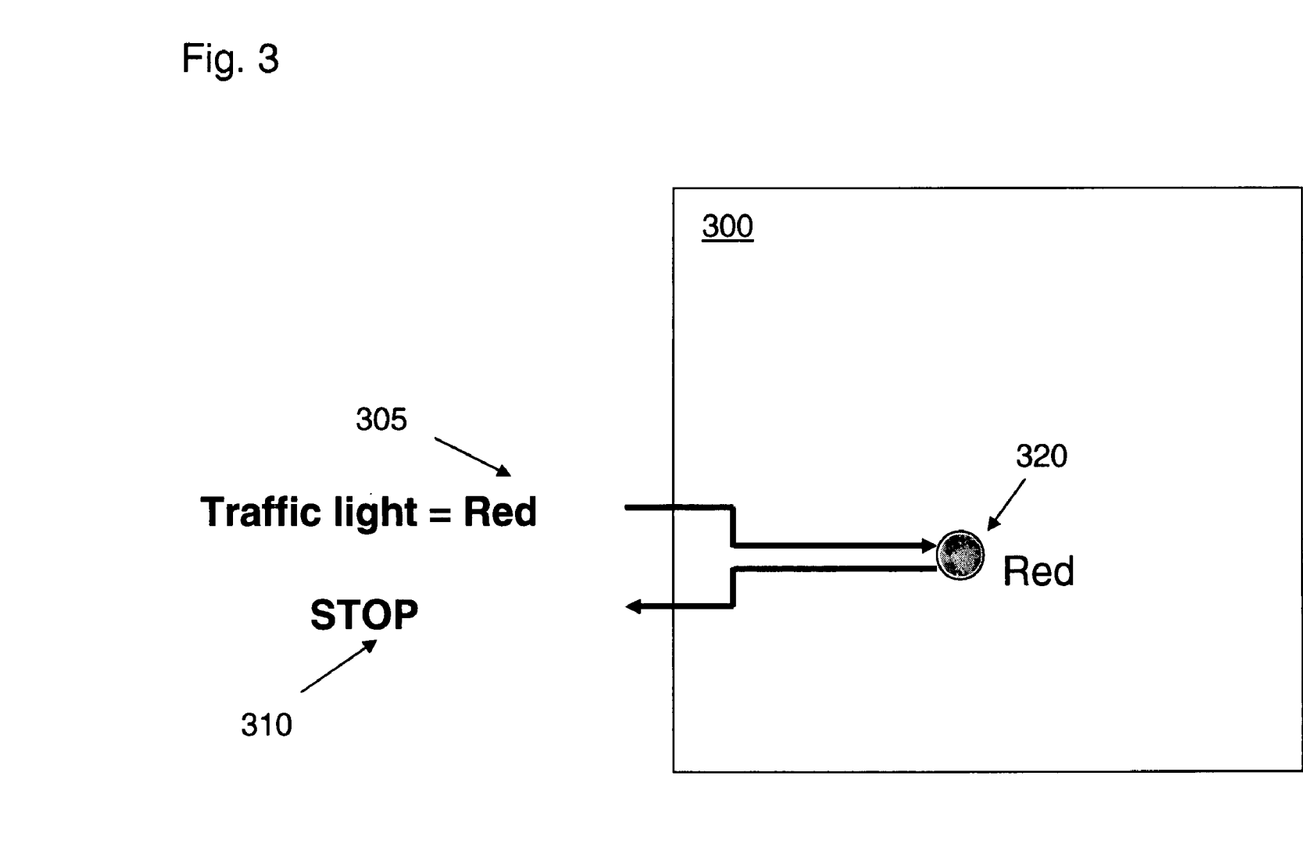
FIG. 3 illustrates a one dimensional cellular decision engine.

With reference to FIG. 3, a one dimensional cellular decision engine 300 is shown. The cellular decision engine 300 receives an XML input message 305 from an entity, such as the tool 200, and processes the input message 305 by conforming to a number of internally held rules 320 stored within each cellular decision engine 300. Once the XML input message 305 has been processed, an XML output message 310 is generated for transmitting to the requesting entity. A rule may be a simple rule, for example, if input message='traffic lights are red'; the output message will be 'STOP'.

Figures 4A, 4B:
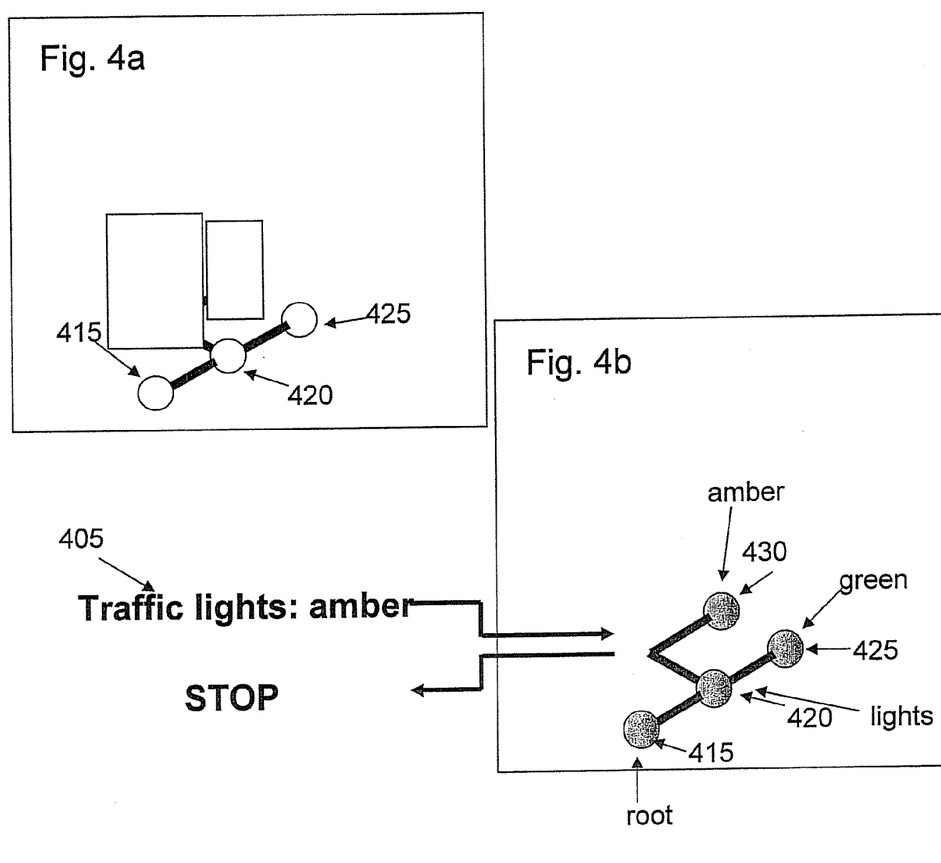
FIGS. 4a and 4b illustrate the cellular decision engine of FIG. 3 comprising a sub hierarchy of decision engines.

FIG. 4a shows a cellular decision engine 415 with a number of sub cellular decision engines 420, 425, 430 which in turn create a hierarchy of sub structures of cellular decision engines 400. Sub cellular decision engines 420, 425, 430 are cellular engines that are linked to a parent cellular decision engine by some form of a relationship. For example, a parent cellular decision engine may be concerned with a class of vehicles and a vehicle's attributes, for example, a vehicle has an engine, a housing, wheels and a drive shaft. But a sub cellular decision engine may be concerned with a sub class of vehicles. For example, cars, motorbikes, trucks, vans and airplanes, etc; thus, forming a hierarchy of classes of sub cellular decision engines 420, 425, 430.

The processing of the input message 405 and the creation of the sub cellular decision engines 420, 425, 430 is determined by a set or pre-defined rules; each rule being unique to each class of cellular decision engine. For example, one set of rules may pertain to the class of vehicle and another set of rules may pertain to the sub class of cars etc.

Each cellular decision engine 415 on receiving an input message 405 processes the input message 405 according to the predefined rules. The pre-defined rules determine how the input message 405 is processed and whether any sub cellular decision engines 420, 425, 430 are created. The cellular decision engines process the input messages by performing the following steps:

Comparing the name of the message with the name of the cellular decision engine.

Comparing the structure and values of the input message with the sub hierarchies (Contexts) of the cellular decision engines.

Comparing the output of the message with the output defined for each sub hierarchy of cellular decision engines (Context).

For example, given the following simple XML input message 405 and with reference to FIG. 4b. 1

Input Message: Traffic Lights 1

```
<root>
    <Scenario>
        <output>
            <traffic lights value = 'amber'>
        </output>
        <input>
            <red ='stop'/>
            <amber value = 'stop'/>
            <green value = 'go'/>
        <input>
    </scenario>
</root>
```

The cellular decision engine 415 on receiving the input message 405 cascades the input message 405 through the hierarchical structure to a second cellular decision engine 420. The second cellular decision engine 420 compares the value of the root tag (<Messagebody>) with a list of sub cellular decision engines within the hierarchical structure. On identification of a sub cellular decision engine 425, the input message is cascaded to the identified sub cellular decision engine 425. The predefined rules within the sub cellular decision engine 425 process the cascaded data elements of the input message 415 according to its rules. Once processed the output element of the message defines the message that should be generated whenever the scenario of lights is observed in the scenario.

The training message enables the definition of messages for training and application. Training messages comprise input and output elements, as shown above, and are used to provide a hierarchical definition of a concept. The input element of the example message defines the concept of 'traffic light's'. In this case the concept comprises three sub concepts of red, amber and green. The output elements define the message that should be generated whenever this above scenario is observers in the training message.

Other rules within the XML input message state what action to perform if the traffic light is green. For example, if the same input message (input message traffic lights) was received by the cellular decision engine, but in this instance the data value 'red' was changed to 'green'. The rule would be traversed until the action associated with the data element 'green' was located and so on. It is important to note that the rules pertaining to a data value within each cellular decision engine must be an identical match to a data value of the input message. For example the data value 'red' within the input message must match the data value 'red' of the rule, i.e. the letters that make up a word must be identical to the letters making up the word in which the comparison is taking place. Thus, performing symbolic processing and being able to detect any changes within a word or a sentence structure.

In order to create a sub hierarchy of cellular decision engines, the parent cellular decision engine identifies an input message for which there is no sub cellular engine in which to process the new context identified in the input message.

Taking the following input message and with reference to FIG. 4b.

```
<MessageBody type = application>
    <Scenario>
        <output>
            <traffic lights value = 'green'>
        </output>
        <input>
            <red ='stop'/>
            <amber value = 'stop'/>
            <green value = 'go'/>
        <input>
    </scenario>
</MessageBody>
```

The root cellular decision engine 415 receives the input message 405 from the requesting entity and cascades the input message 405 to the next level of sub cellular decision engines (lights) 420. The sub cellular decision engines (lights) 420 compares the data values of the input message with the values of the sub cellular decision engines 420, 425 within the hierarchical structure 400 and attempts to locate a further cellular decision engine to process the data values. In this example, the input value is amber and although there is a sub cellular decision engine 425, its identifier is 'green' and not amber and therefore there is no match. Therefore a further cellular decision engine is created 430 (FIG. 4*a*) with an identifier of amber.

Therefore, a hierarchy of cellular decision engines 415, 420, 425 and 430 are created which allows for the cascade of data elements of the input message to each of the cellular decision engines within the created sub networks. The cellular decision engines within these sub networks process the cascaded messages in a similar manner to their parent cells; this may include the potential construction of sub networks and the generation of output messages. In this manner, a network of cellular decision engines process received messages in a highly recursive manner and emerges into a highly complex cellular topology. As with natural systems, it is envisaged that there will be many different classes of cellular decision engines and that each of these classes will operate according to a unique set of processing rules. It is also envisaged that a cellular decision engine of one class may construct a sub network comprising cells of different classes. For example a parent class 'vehicle' may comprise child cellular engines, car, boat, truck and airplane. The present invention embodies two types of cellular decision engines, namely, match cells and exception cells.

Match cells represent specific lookup information, such as the fact that 'red' is a color.

Exception cells represent phrases where the meaning of a term is dependent on the context of a sentence. For example, "Luke spoke to John England about the situation".

Both the match cells and the exception cells store the data represented in the XML input messages, i.e. the training messages.

Figure 5:
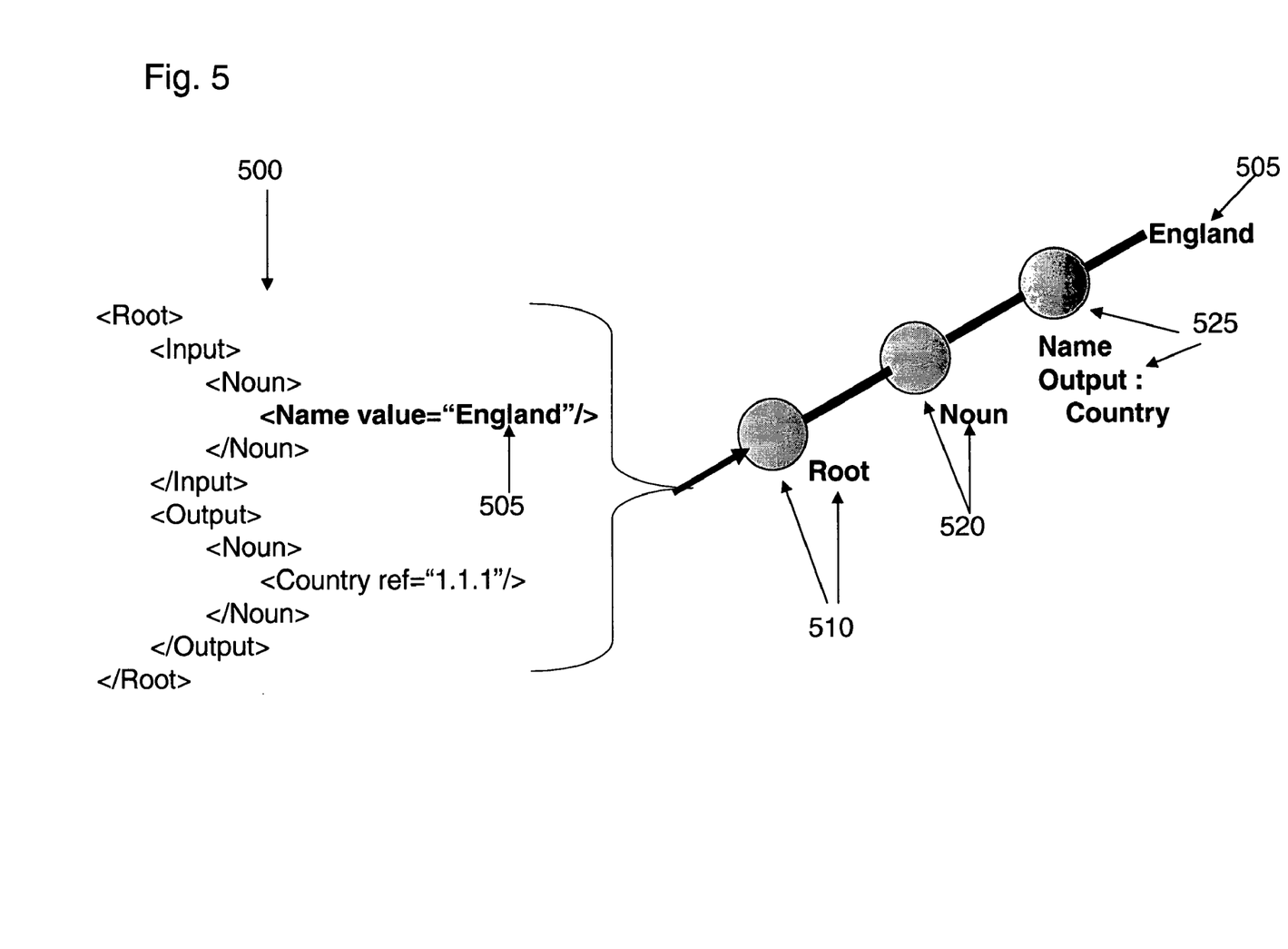
FIG. 5 illustrates an XML training message for receiving and processing by a cellular decision engine.

Referring to FIG. 5, an example of the processing of an input message by a match cell is shown.

The input message (replicated here for the reader's convenience) is received by a match cell.

Input message from FIG. 5

```
<Root>
    <Input>
        <Noun>
            <Name value="England"/>
```
```
        </Noun>
    </Input>
    <Output>
        <Noun>
            <Country ref="1.1.1"/>
        </Noun>
    </Output>
</Root>
```

The match cells are classified by their class type, in the example of FIG. 5; there are 3 match cells, namely, the parent cellular decision engine—the root, a sub cellular decision engine—noun and a further sub cellular decision engine—name.

The XML input message 500 is received by the root match cell 510 and cascaded to a sub cellular decision engine 520 and a comparison is performed to determine the input value. In this example the input value is determined as a noun. A further comparison is performed to compare the data values of the input message 500 with the identifier values of each of the match cells 520, 525 within the hierarchical structure. As a match is found between the data value 'name' and a match cell 525 whose identifier is also name, the input message 500 is cascaded to the name match cell 525 for processing. Once received by the name match cell, a further comparison is made by the name match cell 525 to determine if a match can be found for the data element 'England' 505. In this example a positive determination is made i.e. a match is found for 'England' 505 and an output message is generated stating that England is a country (according to the output definition of the input message).

Figure 6:
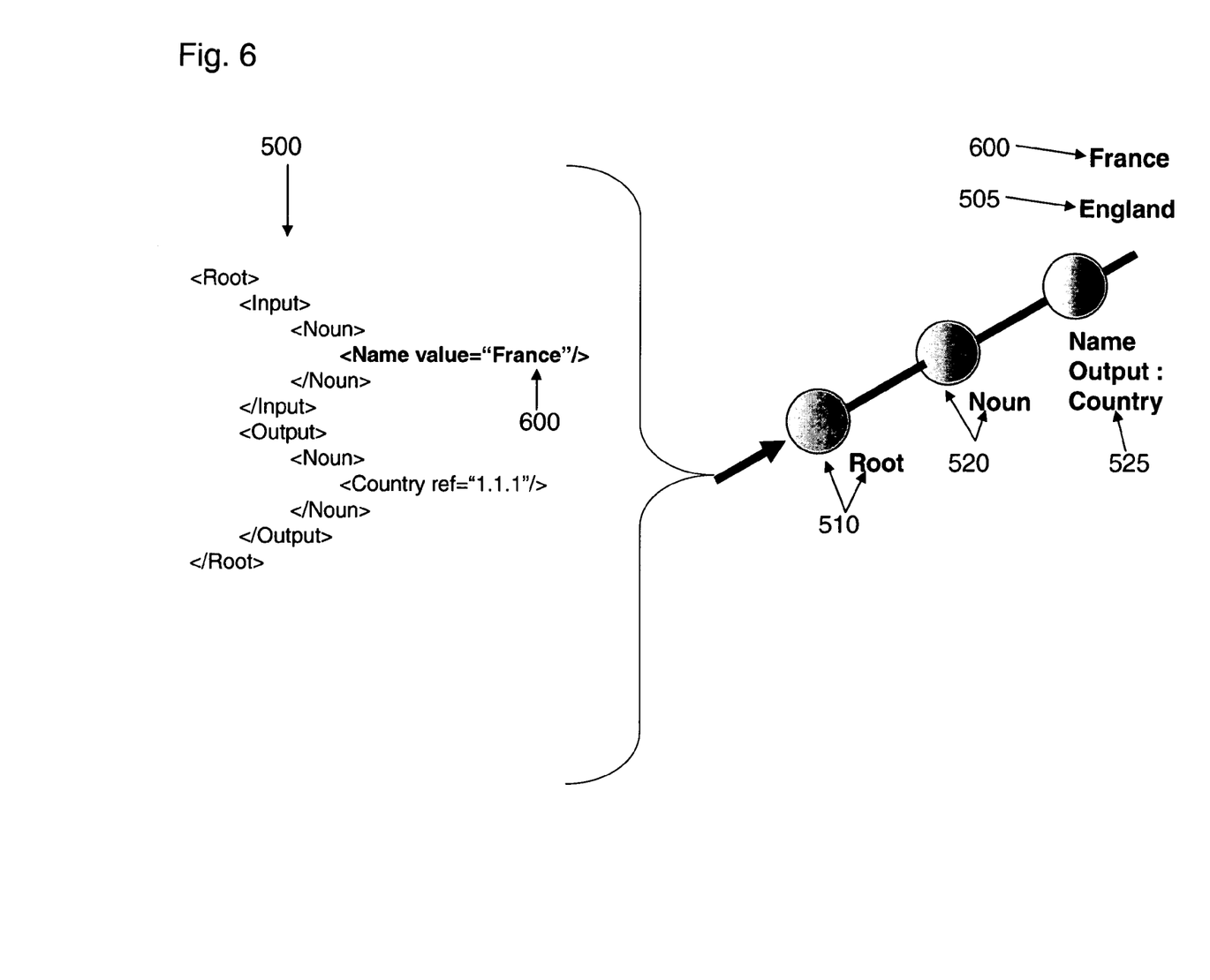
FIG. 6 illustrates the cellular decision engine of FIG. 5 receiving a second XML training message.

A further example of the processing of an input message by a match cell can be seen in FIG. 6. Again taking a similar XML input message 500 as seen in previous examples, the input message is received by the root match cell 510 and cascaded to the noun match cell 520. The noun match cell 520 determines if a match can be made for the name value within the input message. As a positive determination is made the input message is cascaded to the name match cell 525. The name match cell 525 process the input by its internally held rules and generates an output message of the form Country=France 600 and the value of France is stored in a data storage area associated with the name match cell.

The above examples illustrate how match cells are used to process a simple input message where a sub cellular decision engine exists in which to process the cascaded data elements and generate an output message.

Figure 7:
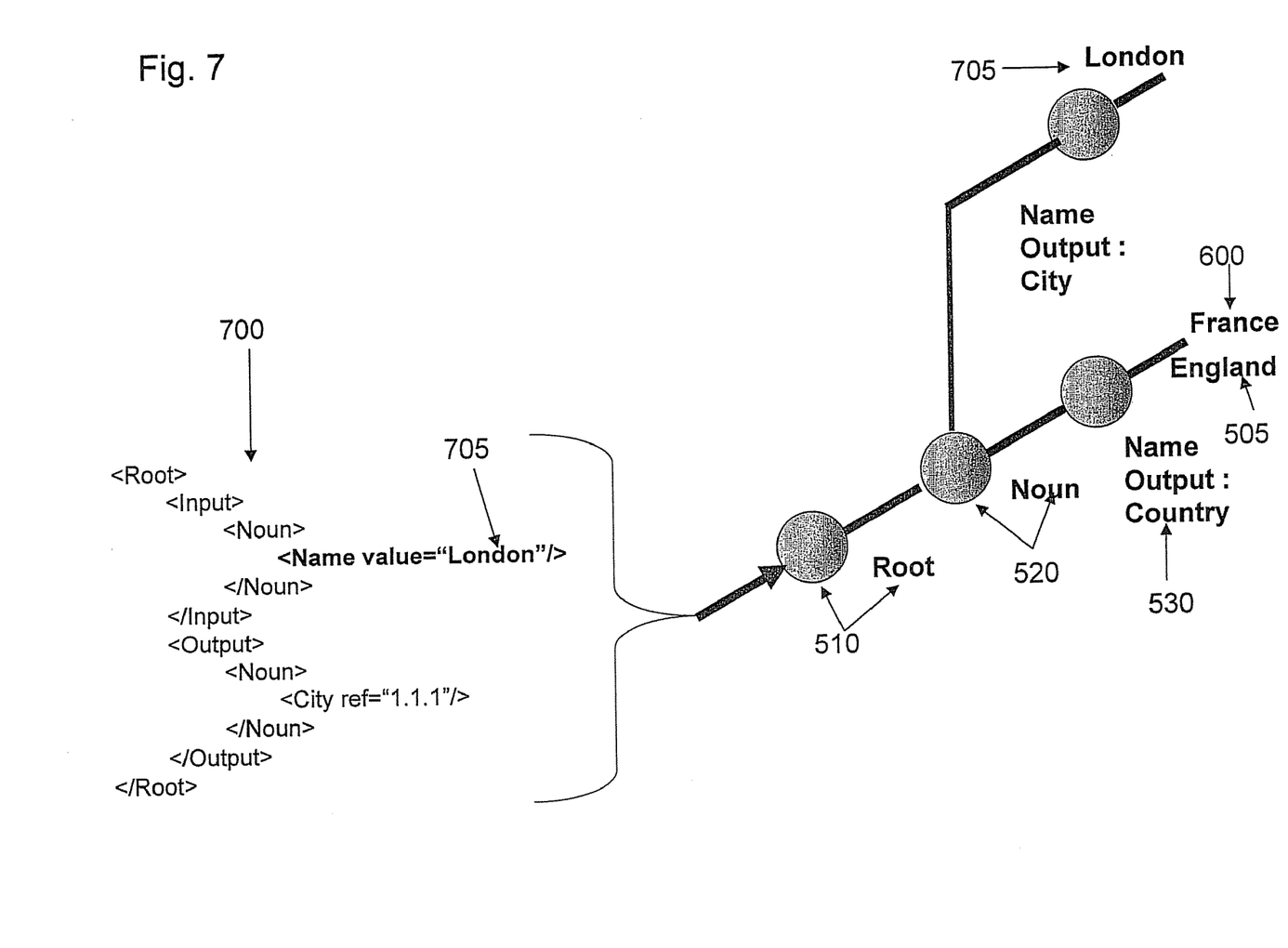
FIG. 7 illustrates the cellular decision engine of FIG. 5 receiving a third XML training message.

FIG. 7 shows what happens when it is determined that a sub cellular decision engine does not exist and therefore, the input message can not be processed and a new context in which to process the input message must be created. Hence adapting and learning from new scenarios and situations.

As can be seen in FIG. 7, an XML input message 700 comprises the input of a noun with a name value of 'London' 705. The XML input message 700 is received by the root cellular decision engine 510 and cascaded to the noun match cell 520. The noun match cell 520 compares the name value with the identifiers of each of the match cells within the hierarchical structure and determines that there is a name match cell 530 who can process the input message and therefore the input message is cascaded to the name match cell 530. The name match cell compares the name value of 'London' with a number of predefined rules. No match is found for the name value 'London'. A further comparison is performed to determine that the output of the message conforms to the output message defined for the name match cell 530. In this example, the output message is defined as a noun of the type city. Therefore a new match cell is created to store the context London with an output defined as a 'City'—thus, learning that London is a city and not a country.

The above examples show how match cells process individual words. When processing sentences or phrases more complex hierarchical structures of cellular decision engines are created then previously discussed.

In order to process more complex contextual phrases, a second type of cellular decision engine is used, namely an exception cell. Exception cells store and process more complex contextual phrases such as:
1. James was driven by the IBM Sports Club
2. James was sponsored by the IBM Sports Club In (1) above, it may be preferable to consider the 'IBM Sports Club' as a location, whilst in (2) is should be considered to represent an organization.

Figure 8:
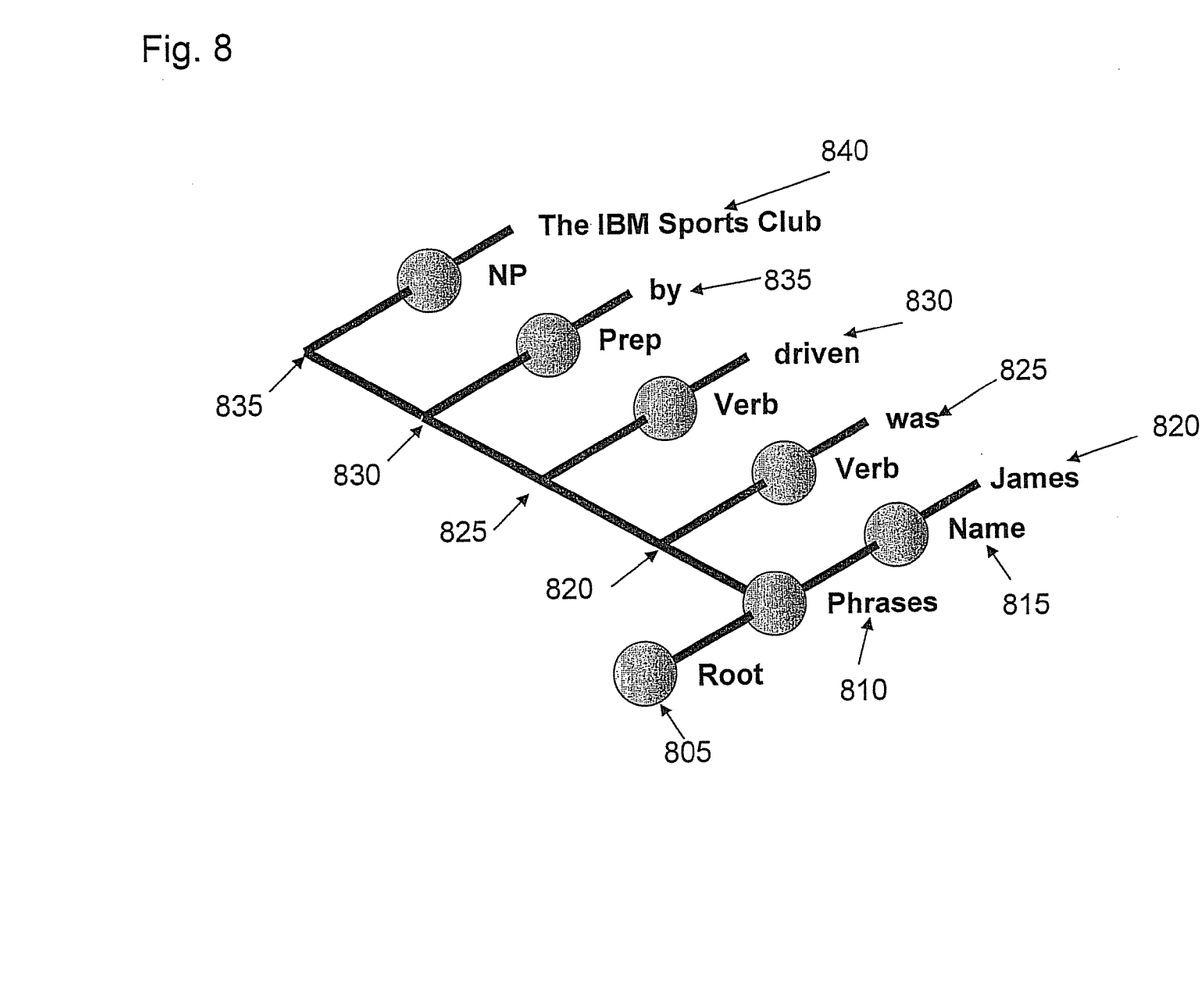
FIG. 8 illustrates an exception cellular decision engine processing a phrase extracted from an XML training message.

Referring to FIG. 8, the exception cell 805 receives the input message in the usual manner and processes the input message in the usual way. For example, the input message is received by the root cell 805, cascaded to the phrase cell 810 and then classified within the individual match 820, 825, 830, 835, 840 cells by the structure of the phrase i.e. 'James' is a name 820, 'was' is a verb 825, 'driven' is a verb 830, 'by' is a preposition 835 and the 'IBM Sports Club' is a noun phrase 840.

Figure 9:
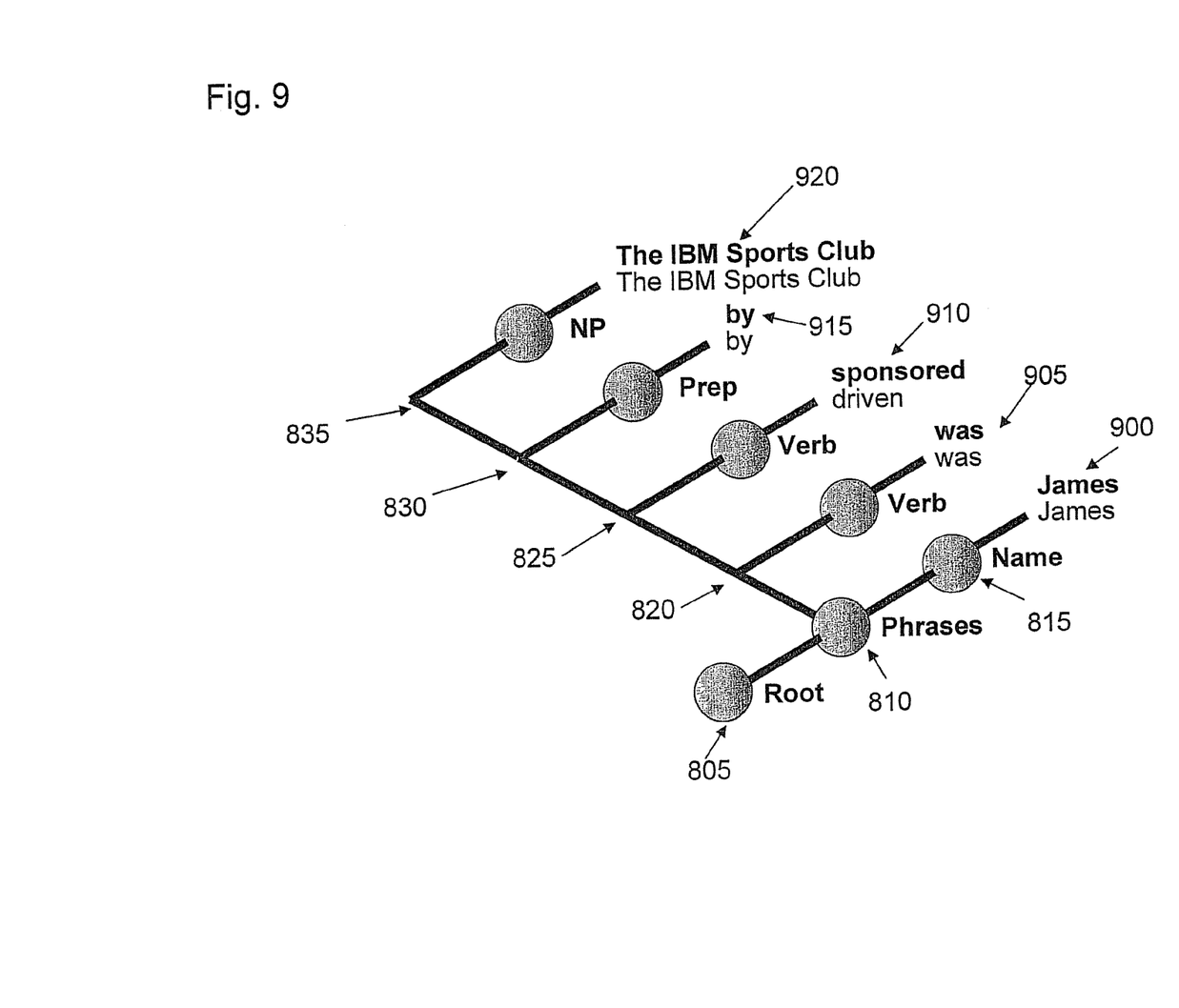
FIG. 9 illustrates the use of inhibit value on the extracted phrase, of FIG. 8, after receiving a second XML training message.

Moving onto FIG. 9, on receipt of a second input message, the second input message is processed in the same way as described above. The data values of the second input message are almost identical to the first input message, except for the word 'sponsored', which changes the context of the phrase. For example, in the first input message 'IBM sports club' may be considered as a club, but in the second input message it may be considered as an organization. In order to reflect this added complexity an exception cell allows inhibit values 900, 905, 910, 920 to be placed onto an exception cell, in order to stop the cell triggering a rule when presented with this type of scenario. Therefore the generic rule will apply to all match cells except when an inhibit value is in place and then at that point it is the inhibit value that takes precedent.

Figure 10:
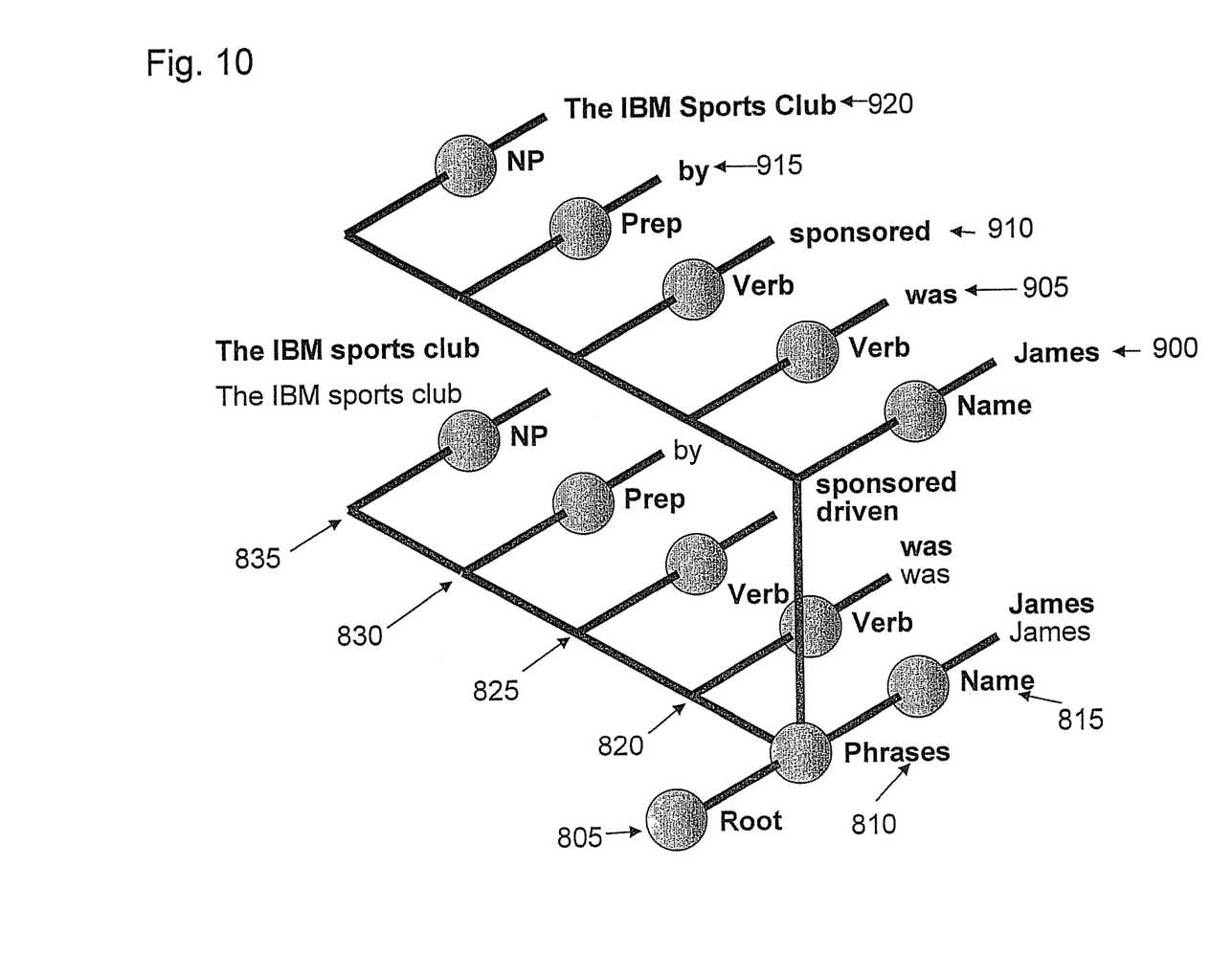
FIG. 10 illustrates the creation of a new cell structure after processing the second XML training message.

After the relevant inhibit values have been stored, a new structure representing the new scenario is created, as illustrated with reference to FIG. 10. As is shown, the match cells of the first input message of FIG. 8 are shown i.e. name 815, verb 820, verb 825, prep 830, noun phrase 835, overlaid by the inhibit values as discussed with reference to FIG. 9. Finally an addition cell structure has emerged and that is the combination of the match cells 900, 905, 910, 915, 920 derived from processing the data values of the second input message.

Figure 11:
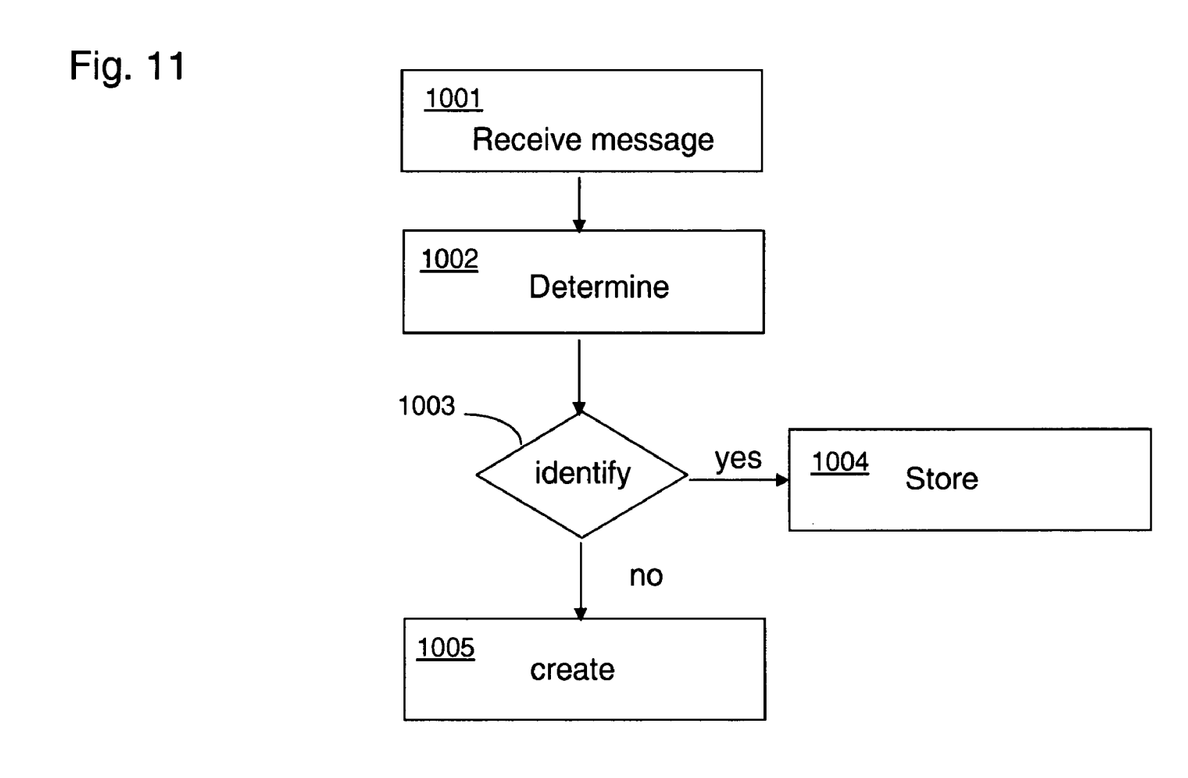
FIG. 11 is a flow diagram illustrating the operational steps of the invention.

Finally referring to FIG. 11, a flow chart is shown illustrating the operational step of the invention. Referring to step 1001, a message is received by an entity, the entity maybe a computer program. The message may take the form on an XML message or some other hierarchical data formatting language. At step 1002, the received message is communicated to a first cellular decision engine and the first cellular decision engine parses the input message to identify an input value. On determination of the input value control moves to decision 1003 and the first decision engine identifies whether there exists within the cellular decision engine network a sub cellular decision engine whose identifier matches the identifier of the input value.

If a positive determination is made control passes to step 1004 and the input values are stored. Moving back to decision 1003, if a negative determination in made control moves to step 1005 and the third unidentified cellular decision engine is created. This process is completed for all input values within the input message and further input messages.

The invention claimed is:

1. A method for creating hierarchical classifiers of software components in a learning system for processing an input message, the method comprising the steps of:
   receiving text in a first window of a hierarchical fact extraction tool;
   building at least one rule from the received text comprising identifying a text structure in the received text, wherein the text structure comprises a word having multiple meanings in current usage of the word; and selecting a specific meaning from the multiple means based on a context of the text structure;
   wherein the multiple meaning of the word comprise a calendar data and a name of a person, wherein the text structure comprises a grammatical element followed by the word, wherein the grammatical element is selected from the group consisting of a demonstrative, a verb, an adjective, a definite article, a noun, and a noun preposition, and wherein said selecting the specific meaning comprises selecting the calendar date;
   transforming the at least one rule into a XML training message, said XML training message comprising output tags that define an output message and input tags that comprise at least one input value for generating the output message;
   receiving the input message by a first software component, said first software component consisting of a cellular decision engine of a plurality of decision engines of a hierarchy, said input message consisting of the XML training message;
   identifying at least one subcellular decision engine of the plurality of decision engines, each subcellular decision engine hierarchically related to the cellular decision engine as a child of the cellular decision engine;
   parsing the input message to identify a first input value of the at least one input value;
   ascertaining that no subcellular decision engine of the at least one subcellular decision engine has an identifier that is identical to the identified first input value;
   responsive to said ascertaining, creating an additional subcellular decision engine in the hierarchy, said additional subcellular decision engine hierarchically related to the cellular decision engine as an additional child of the cellular decision engine;
   assigning an identifier to the created additional subcellular decision engine, the identifier being identical to the identified first input value;
   generating a conforming output message in conformity with the defined output message in the output tags and with inclusion of the first input value; and
   transmitting the conforming output message to a requesting entity.

2. The method of claim 1, wherein said generating the conforming output message comprises implementing a first rule comprised by the plurality of decision engines.

3. The method of claim 2, wherein the first rule specifies an action to perform in relation to the identified first input value.

4. The method of claim 2, wherein the first rule imposes an inhibit value on the identified first input value.

5. The method of claim 3, wherein the inhibit value inhibits a rule that triggers an action.

6. The method of claim 1, wherein the at least one input value in the input tags in the XML training message comprise a plurality of input values forming a structure of a context.

7. The method of claim 6, wherein the context is a sentence, a phrase, a word, or a numerical value.

8. The method of claim 1, wherein the multiple meaning of the word comprise a calendar date and a name of a person, wherein the text structure is characterized by the word appearing as a first word of a sentence, wherein said selecting the specific meaning comprises selecting the name of the person, and wherein said building at least one rule further comprises building an inhibit rule that inhibits triggering an action in relation to the text structure.

9. The method of claim 1, wherein said building at least one rule comprises identifying a particular structure in the received text, and wherein the at least one rule comprises a generalization rule that classifies the particular structure as a reference numeral.

10. The method of claim 1, wherein the tool further comprises a second window distinct from the first window, and wherein the second window is configured to enable a user to select core management functions pertaining to the at least one rule and the tool.

11. The method of claim 10, wherein the core management functions comprise said building of the at least one rule, application of the at least one rule, and management of the at least one rule.

12. A data processing system comprising a processor and a computer readable memory unit coupled to the processor, said memory unit containing software code that when executed by the processor performs the method of claim 1.

13. A computer program product, comprising a computer usable storage medium having computer software code that when executed on a computer causes the computer to perform the method of claim 1.

14. The method of claim 10, wherein the core management functions comprise configuration of the tool.

* * * * *

UNITED STATES PATENT AND TRADEMARK OFFICE
CERTIFICATE OF CORRECTION

PATENT NO. : 7,657,495 B2  Page 1 of 1
APPLICATION NO. : 11/253103
DATED : February 2, 2010
INVENTOR(S) : Hunter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 291 days.

Signed and Sealed this

Thirtieth Day of November, 2010

David J. Kappos
*Director of the United States Patent and Trademark Office*